(12) United States Patent
Dupas-Langlet et al.

(10) Patent No.: US 11,412,769 B2
(45) Date of Patent: Aug. 16, 2022

(54) POROUS PARTICLES FOR REDUCING SUGAR IN FOOD

(71) Applicant: SOCIETE DES PRODUITS NESTLE S.A., Vevey (CH)

(72) Inventors: Marina Dupas-Langlet, Savigny (CH); Laurent Forny, Lausanne (CH); Julien Philippe Nicolas Mahieux, Jougne (FR); Vincent Daniel Maurice Meunier, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 129 days.

(21) Appl. No.: 16/620,236

(22) PCT Filed: Jun. 6, 2018

(86) PCT No.: PCT/EP2018/064876
§ 371 (c)(1),
(2) Date: Dec. 6, 2019

(87) PCT Pub. No.: WO2018/224539
PCT Pub. Date: Dec. 13, 2018

(65) Prior Publication Data
US 2021/0076723 A1   Mar. 18, 2021

(30) Foreign Application Priority Data

Jun. 7, 2017 (EP) .................... 17174744

(51) Int. Cl.
| | |
|---|---|
| *A23L 33/125* | (2016.01) |
| *A23P 10/20* | (2016.01) |
| *A23L 29/30* | (2016.01) |
| *A23G 3/40* | (2006.01) |
| *A23G 3/42* | (2006.01) |
| *A23G 1/36* | (2006.01) |
| *A23G 1/40* | (2006.01) |
| *A23G 9/32* | (2006.01) |
| *A23G 9/34* | (2006.01) |
| *A23G 3/44* | (2006.01) |
| *A23L 33/185* | (2016.01) |
| *A23L 33/17* | (2016.01) |
| *A23L 33/00* | (2016.01) |

(52) U.S. Cl.
CPC .............. *A23L 33/125* (2016.08); *A23G 1/36* (2013.01); *A23G 1/40* (2013.01); *A23G 3/40* (2013.01); *A23G 3/42* (2013.01); *A23G 3/44* (2013.01); *A23G 9/327* (2013.01); *A23G 9/34* (2013.01); *A23L 29/30* (2016.08); *A23L 33/17* (2016.08); *A23L 33/185* (2016.08); *A23P 10/20* (2016.08); *A23G 2220/02* (2013.01); *A23L 33/30* (2016.08)

(58) Field of Classification Search
CPC ...... A23L 33/125; A23L 33/185; A23L 33/30; A23G 3/42; A23G 3/44; A23G 2220/02; A23P 10/20
USPC ......................................................... 426/103
See application file for complete search history.

(56) References Cited

U.S. PATENT DOCUMENTS

| | | | | |
|---|---|---|---|---|
| 3,639,169 | A * | 2/1972 | Broeg .................. | A61K 9/2095 127/29 |
| 3,930,048 | A * | 12/1975 | Wookey ................. | A23L 27/33 426/548 |
| 2006/0040023 | A1 * | 2/2006 | Zeller .................... | A23C 11/00 426/438 |
| 2007/0212476 | A1 * | 9/2007 | Destephen ........... | A23G 3/0017 426/660 |
| 2010/0136182 | A1 | 6/2010 | Rabault et al. | |
| 2013/0266718 | A1 * | 10/2013 | van der Vegt ........ | A23C 1/045 426/609 |
| 2016/0113302 | A1 * | 4/2016 | Zimmer .................. | A23C 1/12 159/3 |
| 2016/0205986 | A1 | 7/2016 | Walther et al. | |

FOREIGN PATENT DOCUMENTS

| | | | | |
|---|---|---|---|---|
| WO | 2006005525 | | 1/2006 | |
| WO | WO-2010112359 | A1 * | 10/2010 | ............. A23L 2/395 |
| WO | 2012050439 | | 4/2012 | |

OTHER PUBLICATIONS

Adhikari et al. "Effect of addition of proteins on the production of amorphous sucrose powder through spray drying" Journal of Food Engineering, 2009, vol. 94, pp. 144-153.

* cited by examiner

*Primary Examiner* — Jyoti Chawla
(74) *Attorney, Agent, or Firm* — K&L Gates LLP (57) ABSTRACT

The present invention relates to porous particles comprising a sweetener, a bulking agent and a non-dairy protein. Further aspects of the invention relate to a food product comprising the porous particles; a process of making the porous particles and a fat based confectionery product containing them; and the use of the porous particles as sugar replacers in food products such as fat based confectionery products for example, chocolate.

5 Claims, 4 Drawing Sheets

POROUS PARTICLES FOR REDUCING SUGAR IN FOOD

CROSS REFERENCE TO RELATED APPLICATIONS

The present application is a National Stage of International Application No. PCT/EP2018/064876, filed on Jun. 6, 2018, which claims priority to European Patent Application No. 17174744.7, filed on Jun. 7, 2017, the entire contents of which are being incorporated herein by reference.

FIELD OF THE INVENTION

The present invention relates to porous particles comprising a sweetener, a bulking agent and a non-dairy protein. Further aspects of the invention relate to a food product comprising the porous particles; a process of making the porous particles and a fat based confectionery product containing them; and the use of the porous particles as sugar replacers in food products, and a fat based confectionery material such as for example, chocolate.

BACKGROUND OF THE INVENTION

The increasing interest in reduced sugar intake in the diet by health conscious consumers has led to a strong demand for food products with lower sugars. Sugar, however, is a key food ingredient that in addition to imparting natural sweetness to food products also functions to provide bulk and therefore plays a significant role in the structure, volume and mouthfeel of the finished food product.

Sugar is a naturally occurring sweetener that as aforementioned provides the sweetness in food products that consumers crave but is also highly calorific and so there is an important need for healthier, non-caloric or low-caloric sweetener alternatives. There have been many approaches that are well known in the art, involving the replacement or reduction of sugars in food products such as for instance using artificial sweeteners to replace natural sugar. More particularly, for example, for fat based confectionery products such as chocolate, many attempts have been made to provide a substitute for sugar using reduced sugar alcohols or 'polyols. Other approaches have included using bulking agents such as, non or low-caloric fibres to replace sugar in chocolate compositions. These approaches however, have associated disadvantages, for instance polyols are well known to have undesirable laxative effects and furthermore such artificial sweeteners are not well perceived by consumers who have a preference for clean label products. There are also certain disadvantages linked to the use of bulking agents to replace sugars in food products this is mainly the associated undesirable impact on sweetness usually a reduction in sweetness.

Thus, it is generally well known to those skilled in the art of food manufacturing that replacing or reducing sugar in a food composition usually negatively impacts the flavour, and other taste components. For instance, sugar replacers may be slower in onset of the sweetness perception and longer in duration compared to natural sugar and so therefore change the taste balance of a food composition.

In addition sugar replacers may not deliver as sweet a taste as natural sugar and may also exhibit, metallic, cooling, astringent, liquorice-like, and bitter after tastes.

In a further example, applying the prior art solutions as aforementioned for fat based confectionery products may also result in similar disadvantages. For instance, using bulking agents such as fibres in chocolate compositions leads to bitter aftertastes and adds undesirable bulk to the mixture, resulting in an increase in the viscosity of the mixture. This in turn makes it difficult to carry out the standard post-processing of the mixture such as enrobing and moulding which are essential steps towards furnishing a finished chocolate product.

There thus remains the problem of providing low calorie or reduced sugar alternatives to natural sugar which may be used in food products or confectionery products without having a detrimental impact on the sweetness perception and/or any of the above associated problems of the prior art solutions.

Accordingly, there remains a need to find low calorie sugar replacers that can be used in a food product or confectionery compositions such as chocolate for example, which avoids the problems of loss or reduction in sweetness, bitter aftertastes and off-flavours.

Accordingly there remains a need to provide low calorie sugar replacers that are "clean label" and more desirable to the consumer.

It is thus desirable to provide a healthier, reduced calorie or reduced sugar alternative to natural sugar that may be used in food products or confectionery products wherein there is little or no negative impact on sweetness perception.

There thus exists a need to solve one or more of the above mentioned problems.

It is an object of the present invention to ameliorate at least one disadvantage of the prior art as aforementioned of previous reduced or low calorie sugar alternatives such as artificial sweeteners and/or bulk sugar replacers such as fibres.

SUMMARY OF THE INVENTION

Accordingly this need is solved by the features of the independent claims. The dependent claims further develop the central idea of the invention.

Thus, in a first aspect, the present invention relates to porous particles comprising (for example consisting of) an amorphous continuous phase, the amorphous continuous phase comprising a sweetener, a bulking agent and a non-dairy protein. Said porous particles may have a closed porosity of between 10 and 80% (for example between 20 and 60%). Said particles may be spherical, for example they may have a sphericity of between 0.8 and 1. Alternatively, the porous particles may be non-spherical, for example they may have been refined, for example by roll refining.

In an embodiment, the porous particles of the present invention have a D90 particle size between 30 and 140 microns. For example the porous particles of the present invention may have a D90 particle size less than 60 microns, for example between 30 and 60 microns, for further example between 35 and 50 microns.

It has been surprisingly found by the inventors that the porous particles of the present invention can be used to replace at least some of the sugar (such as sucrose) in a food product without having a detrimental effect on the sweetness of the food product.

Also surprisingly it was found that the porous particles of the present invention comprising an amorphous continuous phase overcome the problems normally associated with handling amorphous sugar based powder materials and can, contrary to many known amorphous sugar based materials, be used in chocolate compositions, for example. So for example, because of the hygroscopic nature and so its water content amorphous sugar is not typically used in chocolate compositions. It undesirably absorbs water from the environment and other chocolate ingredients generating potential difficulties during processing and storage. Furthermore the amorphous state can be unstable, and amorphous sugars, such as sucrose or dextrose, tend to rapidly crystallise in the presence of moisture and release moisture from crystallisation.

Advantageously, it was found that the porous particles of the present invention dissolve faster in water than crystalline sucrose. This rapid dissolution in the mouth can deliver enhanced sweetness perception. Surprisingly, porous particles comprising an amorphous continuous phase comprising a sweetener, a bulking agent and a non-dairy protein dissolve faster than similar amorphous porous particles where the protein is the milk protein, casein.

In another aspect, there is provided a food product comprising the porous particles of the present invention. The food product may for example contain 5 to 60% of the porous particles.

In an embodiment the food product according to the present invention is a confectionery product, a culinary product, a pet food, a nutritional formula, a breakfast cereal or an ice-cream.

In a still further embodiment of the present invention the food product is a fat based confectionery product for example chocolate.

Advantageously the present invention makes possible the preparation of food products such as fat based confectionery products in which the high calorific conventional crystalline sugar can be wholly and/or partially replaced by the low calorific amorphous porous particles of the present invention.

In another aspect of the present invention there is provided a process of making porous particles comprising the steps of:
a) subjecting a mixture comprising sweetener, bulking agent and non-dairy protein to high pressure, for example 50 to 300 bar;
b) adding gas to the pressurised mixture;
c) drying (for example spraying and drying) the mixture to form porous particles comprising an amorphous continuous phase; and
d) optionally, reducing the particle size of the porous particles.

In another aspect there is provided a use of the porous particles of the present invention as a sugar replacer (for example a bulk sugar replacer) in a food product.

It was surprisingly found that at least 10 volume %, for example at least 30 volume %, for further example at least 60 volume % of the usually required sweetener such as sugar can be eliminated from the foodstuff while still achieving the same desired level of sweetness perception using the porous particles of the present invention to replace the sweetener.

In another aspect of the present invention there is provided a fat based confectionery composition comprising
   a) cocoa powder or cocoa liquor or cocoa butter or cocoa butter equivalents or any combinations thereof and
   b) 5 to 60 wt % of porous particles according to the present invention
wherein said porous particles comprise an amorphous continuous phase comprising a sweetener, a bulking agent and a non-dairy protein. Said porous particles may have a closed porosity of between 10 and 80% (for example between 20 and 60%).

In another aspect of the present invention there is provided a sugar replacement composition comprising porous particles comprising an amorphous continuous phase comprising a sweetener, a bulking agent and a non-dairy protein. Said porous particles may have a closed porosity of between 10 and 80% (for example between 20 and 60%).

Surprisingly the porous particles of the present invention overcome, at least in part, the usual problems associated with handling amorphous powders such as hygroscopicity.

Advantageously, the porous particles having of the present invention having an amorphous continuous phase are more stable and less likely to recrystallize to the crystalline form.

Furthermore advantageously, the present invention makes possible the preparation of food products, in particular fat based confectionery food products incorporating the porous particles of the present invention, having better stability such as lesser likelihood of undesirable recrystallization of the sweetener and so resulting in a longer shelf life of such products.

Advantageously the porous structure of the particles of the present invention retain their structural integrity (for example their closed porosity) even when undergoing heavy processing for example conching during chocolate manufacture.

It has been surprisingly found by the inventors that the majority of the internal closed porosity of the porous particles of the present invention survives, more particularly that the particles retain at least 20% closed porosity after chocolate manufacturing.

Without being bound by theory it is believed that particles comprising sweetener (for example sugar) in the amorphous state and having porosity (particularly internal closed porosity) provide a material which dissolves more rapidly than crystalline sugar particles of a similar size. This rapid dissolution in the oral cavity when consumed leads to an enhanced sweetness perception and ensures that more of the sugar is dissolved and reaches the tongue rather than being swallowed untasted.

In a further aspect of the present invention there is provided a sugar replacement composition suitable for partial or whole replacement of sugar in foodstuffs.

Advantageously, the present invention provides replacement of sugar in foodstuffs but still achieving the same or similar level of sweetness. The present invention makes it possible to completely replace sugar in a foodstuff, for example a chocolate product, with the porous particles of the present invention, achieving at least 65% sugar reduction by volume in one aspect of the present invention.

Advantageously the porous particles of the present invention can be used as a natural low calorie sugar alternative. The porous particles of the present invention may be free from ingredients not commonly used by consumers when preparing food in their own kitchen, in other words, the porous particles of the present invention may consist of so-called "kitchen cupboard" ingredients. Thus, the porous particles of the present invention may provide the reduction of sugar in food products without the need to use artificial sweeteners (for example high-intensity sweeteners) and/or without the need to use materials such as silica or cellulose.

In a further aspect, the invention provides a fat based confectionery material having the same sweetness as a control fat based confectionery material, the control having a sucrose content between 20 and 45% (for example between 25 and 40%), but wherein the sucrose content has been reduced by at least 20% compared to the control, and wherein the fat based confectionery material contains no mono, di or tri-saccharides apart from sucrose or lactose and contains no sugar alcohols or high intensity sweeteners.

BRIEF DESCRIPTION OF THE DRAWINGS

FIG. 1 shows proteins solutions before stirring (FIG. 1A), after 30 seconds stirring (FIG. 1B), and after 45 minutes standing (FIG. 10). The solutions from left to right are wheat protein, sodium caseinate, pea protein and potato protein.

DETAILED DESCRIPTION OF THE INVENTION

According to the present invention the term 'amorphous' as used herein is defined as being a glassy solid, essentially free of crystalline material.

According to the present invention the term glass transition temperature (Tg) as used herein is to be interpreted as is commonly understood, as the temperature at which an amorphous solid becomes soft upon heating or brittle upon cooling. The glass transition temperature is always lower than the melting temperature (Tm) of the crystalline state of the material. An amorphous material can therefore be conventionally characterised by a glass transition temperature, denoted Tg. A material is in the form of an amorphous (glassy) solid when it is below its glass transition temperature.

Several techniques can be used to measure the glass transition temperature and any available or appropriate technique can be used, including differential scanning calorimetry (DSC) and dynamic mechanical thermal analysis (DMTA)

In an embodiment of the present invention the amorphous continuous phase of the porous particles is characterised as having a glass transition temperature of 40° C. or higher, for example 50° C. or higher and further example 60° C. or higher.

Advantageously in contrast to prior art solutions, the porous particles of the present invention are less hygroscopic making such material easier to handle and incorporate into conventional preparations of foodstuffs such as for example chocolate manufacture.

The porous particles of the invention may comprise an amorphous continuous phase with dispersed inclusions which may or may not be amorphous.

According to the present invention the term porous as used herein is defined as having multiple small pores, voids or interstices, for example of such a size to allow air or liquid to pass through. In the context of the present invention porous is also used to describe the aerated nature of the particles of the present invention.

In the present invention the term porosity as used herein is defined as a measure of the empty spaces (or voids or pores) in a material and is a ratio of the volume of voids to total volume of the mass of the material between 0 and 1, or as a percentage between 0 and 100%

Porosity can be measured by means known in the art. For instance, the particle porosity can be measured by the following equation:

Porosity=Vp−Vcm/Vp×100 wherein Vp is the Volume of the particle and Vcm is the volume of the matrix or bulk material.

According to the present invention the term closed or internal porosity as used herein refers in general terms to the total amount of void or space that is trapped within the solid. As can be seen in the figures, fragmented porous particles of the present invention show the internal micro structure wherein the voids or pores are not connected to the outside surface of the said particles. In the present invention the term closed porosity is further defined as the ratio of the volume of closed voids or pores to the particle volume.

Increasing the porosity of the particles increases their dissolution speed in water. This increased dissolution speed enhances the sweetness impact of the particles. However, increasing the porosity of the particles also increases their fragility. It is advantageous that the porous particles of the present invention exhibit closed porosity. Particles with closed porosity, especially those with many small spherical pores, are more robust than particles with open pores, as the spherical shapes with complete walls distribute any applied load evenly. When added to a fat-based confectionery material, closed porosity has a further advantage over open porosity in that fat does not penetrate inside the particle. This penetration inside the particles would reduce the "free" fat available to coat all the particles in the fat-based confectionery material and lead to an increase in viscosity.

In an embodiment of the present invention, the porous particles have a closed porosity of between 10 to 80%, for example 20 to 70%, for further example 20 to 60%.

In a further embodiment, the porous particles of the present invention have a closed porosity of between 40 to 60%, for example 50 to 60%.

The porous particles of the invention may have a normalized specific surface of between 0.10 and 0.18 m$^{-1}$, for example between 0.12 and 0.17 m-1. The porous particles of the invention may have a normalized specific surface of between 0.10 and 0.18 m-1 (for example between 0.12 and 0.17 m-1) and a particle size distribution D90 of between 30 and 140 microns (for example between 40 and 90 microns).

$$\text{Normalized specific surface} = \frac{\text{interstitial surface area of pores} + \text{external surface area of material}}{\text{solid volume of material}}$$

Normalized specific surface area may be measured by computer tomography of three dimensional images of the internal structure. After sub volume extraction, stacks of images may be thresholded using an automatic routine to specifically select the matrix material and calculate its volume. Then the surface of each sample may be estimated using the surface generation software and the surface values extracted and normalized specific surface calculated as above.

According to the present invention the term density is the mass per unit volume of a material. For porous powder, three terms are commonly used; apparent density, tap density and absolute density. Apparent density (or envelope density) is the mass per unit volume wherein pore spaces within particles are included in the volume. Tap density is the density obtained from filling a container with the sample material and vibrating it to obtain near optimum packing. Tap density includes inter-particle voids in the volume whereas apparent density does not. In absolute density (or matrix density), the volume used in the density calculation excludes both pores and void spaces between particles.

In an embodiment of the present invention the porous particles of the present invention have an apparent density of between 0.3 to 1.5 g/cm³, for example 0.5 to 1.0 g/cm³, for further example 0.6 to 0.9 g/cm³.

As previously described, the amorphous and porous nature of the particles leads to faster dissolution in the mouth. This not only enhances sweetness impact but is believed to make the particles less easily detected by the tongue and palate. Advantageously the highly porous and amorphous nature of the particles of the present invention provides an enhanced sweetness and attractive mouthfeel, particularly in fat based confectionery products where the prior art disadvantages associated with replacing sugar with conventional bulking agents usually leads to poor organoleptic qualities, such as grittiness and lack of sweetness.

The D90 value is a common method of describing a particle size distribution. The D90 is the diameter where 90% of the mass of the particles in the sample have a diameter below that value, it is sometimes written as $d_{90}$. In the context of the present invention the D90 by mass is equivalent to the D90 by volume. The D90 value may be measured for example by a laser light scattering particle size analyser. Other measurement techniques for particle size distribution may be used depending on the nature of the sample. For example, the D90 value of powders may conveniently be measured by digital image analysis (such as using a Camsizer XT) while the D90 value of particles comprised within a fat continuous material such as chocolate may be measured by laser light scattering.

The porous particles of the present invention may have a diameter D90 below 450 microns, for example below 140 microns, for further example between 30 and 140 microns. The porous particles of the present invention may have a diameter D90 of less than 90 microns, for example less than 80 microns, for further example less than 70, for further example less than 60 microns. In an embodiment, the porous particles of the present invention have been refined.

In the present specification all percentages are expressed by weight (wt %) unless otherwise specified.

According to the present invention the term sweetener as used herein refers to substance which provides a sweet taste. The sweetener may be a sugar, for example a mono, di or oligo-saccharide. The sweetener may be selected from the group consisting of sucrose, fructose, glucose, dextrose, galactose, allulose, maltose, high dextrose equivalent hydrolysed starch syrup, xylose, and combinations thereof. Accordingly, the sweetener comprised within the amorphous continuous phase of the porous particles according to the invention may be selected from the group consisting of sucrose, fructose, glucose, dextrose, galactose, allulose, maltose, high dextrose equivalent hydrolysed starch syrup xylose, and any combinations thereof.

In an embodiment the porous particles of the present invention comprise sweetener (for example sucrose) in the amount of 5 to 70%, for example 10 to 50%, for further example 20 to 40%. For example the amorphous continuous phase of the particles may comprise sweetener (for example sucrose) in the amount of 5 to 70%, for example 10 to 50%, for further example 20 to 40%.

In one embodiment the porous particles of this invention comprise at least 70% sweetener (for example sucrose). For example the amorphous continuous phase of the porous particles may comprise at least 70% sweetener (for example sucrose).

According to the present invention the term bulking agent refers to a food ingredient that increases food volume or weight without significantly impacting flavour. The bulking agent according to the present invention may be a material which increases food volume or weight without impacting the utility or functionality of a food. In an embodiment of the present invention, the bulking agents of the present invention are low or non-calorific additives which impart bulk and provide advantageously healthier alternatives to for example sugar. The bulking agent may be a biopolymer, for example a sugar alcohol, saccharide oligomer or polysaccharide. In an embodiment, the bulking agent may be a material which is not as sweet as crystalline sucrose on a weight basis. For example the bulking agent may be a sugar alcohol, saccharide oligomer or polysaccharide which is not as sweet as crystalline sucrose on a weight basis.

In an embodiment, the porous particles of the present invention comprise a bulking agent in the amount of 5 to 70%, for example 10 to 40%, for further example 10 to 30%, for still further example 40 to 70%.

In one embodiment, the porous particles of the present invention comprise 10 to 25% of the bulking agent.

According to the present invention the bulking agent may be selected from the group consisting of sugar alcohols (for example isomalt, sorbitol, maltitol, mannitol, xylitol, erythritol and hydrogenated starch hydrolysates), lactose, maltose, fructo-oligosaccharides, alpha glucans, beta glucans, starch (including modified starch), natural gums, dietary fibres (including both insoluble and soluble fibres), polydextrose, methylcellulose, maltodextrins, inulin, dextrins such as soluble wheat or corn dextrin (for example Nutriose®), soluble fibre such as Promitor® and any combination thereof.

In an embodiment of the present invention the bulking agent may be selected from the group consisting of lactose, maltose, maltodextrins, soluble wheat or corn dextrin (for example Nutriose®), polydextrose, soluble fibre such as Promitor® and any combinations thereof.

Wheat gluten provides good wettability and may therefore provide improved mouthfeel for a porous powder comprising an amorphous continuous phase. The porous particles of the invention may comprise (for example consist on a dry basis of) sucrose, soluble fibre and wheat gluten. The amorphous continuous phase of the porous particles of the invention may comprise (for example consist on a dry basis of) sucrose, soluble fibre and wheat gluten. For example the amorphous continuous phase of the porous particles may comprise between 30 and 70% sucrose, between 69 and 29% soluble fibre and between 1 and 4% wheat gluten on a dry basis. The amorphous continuous phase of the porous particles of the invention may comprise (for example consist on a dry basis of) sucrose, maltodextrin (for example DE 12-20) and wheat gluten. For example the amorphous continuous phase of the porous particles may comprise between 30 and 70% sucrose, between 69 and 29% maltodextrin and between 1 and 4% wheat gluten on a dry basis.

Almond milk has been found to provide fast dissolution in a porous particle having an amorphous continuous phase. The porous particles of the invention may comprise (for example consist on a dry basis of) sucrose, maltodextrin (for example DE 12-20) and almond milk. The amorphous continuous phase of the porous particles of the invention may comprise (for example consist on a dry basis of) sucrose, maltodextrin (for example DE 12-20) and almond milk. For example the amorphous continuous phase of the porous particles may comprise between 30 and 70% sucrose, between 69 and 29% maltodextrin and between 1 and 10% almond milk on a dry basis. The amorphous continuous phase of the porous particles of the invention may comprise (for example consist on a dry basis of) sucrose, soluble fibre and almond milk. For example the amorphous continuous phase of the porous particles may comprise between 30 and 70% sucrose, between 69 and 29% soluble fibre and between 1 and 10% almond milk on a dry basis.

The porous particles of the invention may comprise (for example consist on a dry basis of) sucrose, lactose and almond milk. The amorphous continuous phase of the porous particles of the invention may comprise (for example consist on a dry basis of) sucrose, lactose and almond milk For example the amorphous continuous phase of the porous particles may comprise between 30 and 70% sucrose, between 29 and 69% lactose and between 1 and 10% almond milk on a dry basis. The amorphous continuous phase of the porous particles of the invention may comprise (for example consist on a dry basis of) sucrose, lactose and wheat gluten. For example the amorphous continuous phase of the porous particles may comprise between 30 and 70% sucrose, between 69 and 29% lactose and between 1 and 10% wheat gluten on a dry basis.

Sucrose, lactose and plant protein (for example pea protein, wheat gluten or almond protein) provides an amorphous phase for a porous particle which has good stability against recrystallization without necessarily requiring the addition of reducing sugars. For example the porous particles of the invention may be free from reducing sugars (for example fructose, glucose or other saccharides with a dextrose equivalent value. The dextrose equivalent value may for example be measured by the Lane-Eynon method). For example the amorphous continuous phase of the porous particles of the invention may be free from reducing sugars. For further example the porous particles of the invention may be free from oligo- or polysaccharides having a three or more saccharide units, for example maltodextrin or starch. For further example the amorphous continuous phase of the porous particles of the invention may be free from oligo- or polysaccharides having a three or more saccharide units.

The porous particles of the invention may have a moisture content between 0.5 and 6%, for example between 1 and 5%, for further example between 1.5 and 3%.

In the context of the present invention the term "non-dairy proteins" refers to proteins that are not found in bovine milk. The primary proteins in bovine milk are caseins and whey proteins. Some consumers desire to avoid milk proteins in their diets, for example they may suffer from milk protein intolerance or milk allergy and so it is advantageous to be able to offer food products free from dairy proteins. In the context of the present invention, the term milk when not further specified refers to mammalian milk, for example milk from cows, sheep or goats. Where so-called "plant milks" are referred to they will be identified as such, for example almond milk, which may be manufactured by grinding almonds in a blender with water and then straining out the almond pulp. The non-dairy protein comprised within the particles of the invention may act as a surfactant, promoting the formation of a porous structure within the particles (for example a porous continuous phase of the particles) and stabilising the structure during processing. The non-dairy protein may enhance the formation of particles with closed porosity, in particular multiple internal pores which are spherical or nearly spherical in shape and are resistant to being ruptured during processing of the particles. The non-dairy protein comprised within the particles of the invention may be selected from the group consisting of pea proteins, almond proteins, hazelnut proteins coconut proteins, potato proteins, wheat gluten, egg albumin proteins (for example ovalbumin, ovotransferrin, ovomucoid, ovoglobulin, ovomucin and/or lysozyme), clupeine, oat protein, soy proteins, tomato proteins, Brassicaceae seed protein and combinations of these. For example the non-dairy protein comprised within the particles of the invention may be selected from the group consisting of pea proteins, potato proteins, wheat gluten, soy proteins, and combinations of these. For further example the non-dairy protein comprised within the particles of the invention may be selected from the group consisting of coconut protein, almond protein, wheat gluten, and combinations of these. The non-dairy protein comprised within the particles of the invention may be coconut or almond protein. The non-dairy protein comprised within the particles of the invention may be pea or potato protein. The non-dairy protein comprised within the particles of the invention may be wheat gluten.

The porous particles of the invention may comprise for sweetener (for example sucrose) bulking agent and non-dairy protein, all distributed throughout the continuous amorphous phase of the particles. Higher concentrations of the non-dairy protein may be present at the gas interfaces than in the rest of the amorphous continuous phase, but the non-dairy protein may be present in the continuous amorphous phase inside the particles, not just coated onto the exterior. For example, the non-dairy protein may be present in the interior of the particles according to the invention.

In an embodiment, the porous particles of the present invention comprise a non-dairy protein in the amount of 0.5 to 15%, for example 1 to 10%, for further example 1 to 5%, for further example 1 to 3%. For example the amorphous continuous phase of the particles may comprise a non-dairy protein in the amount of 0.5 to 15%, for example 1 to 10%, for further example 1 to 5%, for further example 1 to 3%.

The porous particles of the invention may comprise plant milks, for example the amorphous continuous phase of the porous particles may comprise plant milks. In an embodiment, the porous particles (for example the amorphous continuous phase of the porous particles) comprise a plant milk selected from the group consisting of almond milk, oat milk, spelt milk, coconut milk, soy milk and rice milk. Plant milk is typically produced by grinding the plant material with water and then straining out the solid material. Plant milks may already contain appropriate qualities and quantities of bulking agent to form an amorphous material on drying, but additional bulking agents may be added to form the particles of the invention. For example, bulking agents may be added to increase the glass transition temperature of the amorphous continuous phase of the porous particles. Plant milks contain plant proteins which act as surfactants. The porous particles of the invention (for example the amorphous continuous phase of the particles) may comprise a sweetener, a plant milk and a bulking agent selected from the group consisting of maltodextrin (for example a maltodextrin with a DE between 12 and 20), soluble fibre and lactose. The sweetener may be sucrose (for example at a level of at least 30 wt. % in the particles).

The porous particles of the invention may be coated, for example they may be coated in a thin layer of fat such as cocoa butter. A thin layer of fat further enhances the stability of the particles during transport and storage.

The porous nature of the particles of the invention may lead to them being lighter in colour than solid crystalline materials such as sucrose crystals. This can be counteracted by the addition of opaque or coloured materials. The porous particles of the invention may comprise coloured ingredients, for example caramelized sugars or permitted food colours, for example natural food colours.

According to the present invention there is provided a process for preparing the porous particles of the present invention.

In an embodiment the porous particles of the present invention are prepared according to spray-drying methods as here below described.

In an aspect of the present invention there is provided a process to prepare the porous particle of the present invention comprising in its broad aspects the steps of:
- subjecting a mixture comprising sweetener, bulking agent and non-dairy protein to high pressure, for example 50 to 300 bar, for further example 100 to 200 bar;
- adding gas to the mixture;
- drying (for example spraying and drying) the mixture to form porous particles having an amorphous continuous phase; and optionally,
- reducing the particle size of the porous particles.

The gas may be added before the mixture has been pressurised. In that case the gas may be added at low pressure into the mixture and then pressurised at a later stage in the process line before spray-drying, for example it may be pressurised such that it dissolves in the mixture. However, the process of compressing a gas/liquid mixture can be difficult to control, so preferably the mixture is pressurised before gas is added, in other words gas may be added to the pressurised mixture.

Accordingly the process to prepare the porous particle of the present invention may comprise the steps of:
a) subjecting a mixture comprising sweetener, bulking agent and non-dairy protein to high pressure, for example 50 to 300 bar, for further example 100 to 200 bar
b) adding gas to the pressurised mixture and
c) drying (for example spraying and drying) the mixture to form porous particles having an amorphous continuous phase; and
d) optionally, reducing the particle size of the porous particles.

In an embodiment of the present invention, the mixture comprising sweetener, bulking agent and non-dairy protein may be mixed with 30% water, preferably 40% water and more preferably 50% water until full dissolution is achieved.

In another embodiment of the present invention, the mixture comprising sweetener, bulking agent and non-dairy protein is subjected to high-pressure, for example a pressure greater than 2 bar, typically 50 to 300 bar, for example 100 to 200 bar, for further example 100 to 150 bar.

The gas may be dissolved in the mixture before spraying, the mixture comprising dissolved gas being held under high pressure up to the point of spraying. Typically the gas is selected from the group consisting of nitrogen, air, carbon dioxide, nitrous oxide and argon. The gas may be air. For example the gas may be nitrogen and it is added for as long as it takes to achieve full dissolution of gas in the said mixture. For example the time to reach full dissolution may be at least 2 minutes, for example at least 4 minutes, for further example at least 10 minutes, for further example at least 20 minutes, for further example at least 30 minutes.

The drying may occur during the process of spray-drying. The pressurised mixture being sprayed to form droplets which are then dried in a column of air, for example warm air, the droplets forming a powder.

The step of reducing the particle size of the porous particles may be performed as part of processing the particles into a food product. For example, the particles may be used as an ingredient for the manufacture of a fat based confectionery product and their particle size reduced during the refining process of the fat based confectionery, such as during roll refining. Spray-drying processes are typically adjusted to create agglomerated particles as these are easier to store, transport and handle in factories without issues such as dust generation or caking. However, large agglomerates may lead to undesirable mouthfeel attributes such as powdery-ness and grittiness and so, in a product such as a fat based confectionery product it is generally desirable to reduce the particle size of the solid ingredients. It is advantageous that the porosity of the particles of the invention is able to survive size reduction processes used in chocolate manufacture such as roll refining. Pores of approximately spherical shape provide a strong structure to the particles and having multiple small closed pores means that the particles can be fractured without significant loss of internal porosity.

Other procedures may be used to obtain the porous particles of the invention for example, foam drying, freeze drying, tray drying, fluid bed drying and the like. For foam drying the presence of a surfactant such as non-dairy protein aids the formation of the foam and controls the resulting porosity. In an embodiment the invention provides a process to prepare porous particles comprising foam drying (for example vacuum foam drying) a mixture comprising sweetener, bulking agent and surfactant (for example a non-dairy protein). In a further embodiment the invention provides a process to prepare porous particles comprising freeze drying a mixture comprising sweetener, bulking agent and surfactant (for example a non-dairy protein). The mixture may be freeze dried directly, or it may be sprayed to form droplets before being freeze dried. Freeze drying produces more open porosity than spray drying a gassed mixture under pressure, which is well adapted for producing closed porosity. In a further embodiment the invention provides a process to prepare porous particles comprising fluid bed drying a mixture comprising sweetener, bulking agent and surfactant (for example a non-dairy protein). The mixture may be sprayed to form droplets before being freeze dried. Fluid bed drying may be applied directly after spray drying, the overall moisture being removed in the two stages, namely spray drying and fluid bed drying.

In a further aspect the present invention also provides for porous particles obtained (for example obtainable) by the process of the invention.

According to a general aspect of the present invention, the porous particles of the present invention have a wide range of utilities, including all of the applications in dry food mixes for which sugar is normally employed. For instance, said particles of the present invention may be used in a variety of food products for example, a confectionery product, a culinary product, a dairy product, a nutritional formula, a breakfast cereal or an ice-cream. In one aspect of the present invention the focus is on the use of the porous particles to replace sugar in confectionery products (including both fat and sugar based confectionery products). In an embodiment, the invention provides a food product wherein porous particles have been refined. In the context of the present invention, the term "refined" refers to material which has been subjected to a refining process to reduce the particle size of the material's solids. In the manufacture of fat-based confectionery products, processes such as roll refining and air classifier milling are used to refine the confectionery mass.

In the present invention the term 'confectionery product' or 'fat-based confectionery product' is to be understood as meaning chocolate product, chocolate-like product (e.g., comprising cocoa butter replacers, cocoa butter equivalents or substitutes), a coating chocolate, a chocolate-like coating product, a coating chocolate for ice-creams, a chocolate-like coating for ice-cream, a praline, a chocolate filling, a fudge, a chocolate cream, an extruded chocolate product or the like. The fat-based confectionery product may be a white chocolate; comprising sugar, milk powder and cocoa butter but not dark cocoa material. The fat-based confectionery product may be a dairy-free product, for example a dairy free chocolate or chocolate-like compound. In an embodiment where the fat-based confectionery is dairy-free it should be understood that the porous particles do not comprise dairy ingredients, for example they do not comprise lactose. The product may be in the form of an aerated product, a bar, or a filling, among others. The chocolate products or compositions can be used as coatings, fillers, enrobing compositions or other ingredients in a finished or final food or confectionery product. The confectionery product of the invention may further contain inclusions such as nuts, cereals, and the like.

In an alternative embodiment a confectionery product comprising the particles of the invention may be a sugar confectionery product, for example a sweet powder used as a dip for lollipops or combined with other ingredients to form a sherbet powder.

According to the knowledge of the skilled person the confectionery products comprising the porous particles of the present invention may also be used as a filling between biscuits (for example wafers), as part of a coating or as a coating. It can also comprise inclusions such as nuts, puffed cereal, chocolate chips, sugar chips, fruit pieces, caramel pieces, biscuits, wafers, creams or the like.

In an embodiment of the present invention there is provided a fat based confectionery composition comprising
  a) cocoa powder or cocoa liquor or cocoa butter or cocoa butter equivalents or any combinations thereof and
  b) 5 to 60 wt % of porous particles
wherein said porous particles comprise an amorphous continuous phase comprising sweetener, a bulking agent and a non-dairy protein. For example, said porous particles may have a closed porosity of between 10 and 80% (for example between 20 and 60%).

The porous particles comprised within the fat based confectionery may be free from reducing sugars and/or free from oligo- or polysaccharides having a three or more saccharide units.

In an embodiment to the present invention the fat based confectionery product comprises 5 to 60% of the porous particles, for example 10 to 50%, for further example 20 to 40%.

All terms such as amorphous, porous, sweetener, non-dairy protein, bulking agent and sphericity are as previously defined.

In an embodiment the fat based confectionery product comprises porous particles, the amorphous continuous phase of the particles having a glass transition temperature of 40° C. or higher. In another embodiment the fat based confectionery product comprises porous particles have a D90 particle size below 60 microns, for example between 30 and 60 microns.

According to the present invention the fat based confectionery product comprising the porous particles of the present invention is prepared according to conventional chocolate making processes.

In one embodiment of the present invention there is provided a process of making a fat based confectionery product comprising porous particles comprising the steps of:
  subjecting a mixture (for example an aqueous mixture) comprising sweetener, bulking agent and non-dairy protein to high pressure, for example 50 to 300 bar, for further example 100 to 200 bar;
  adding gas to the mixture;
  drying (for example spraying and drying) the mixture to form porous particles comprising an amorphous continuous phase;
  mixing the porous particles with fat and optionally ingredients selected from the group consisting of cocoa liquor, crystalline sugar, lecithin and combinations of these, for example at a temperature between 35 and 55° C. for 2 to 20 minutes;
  refining the resulting mixture to reduce the particle size of the porous particles; and
  mixing the refined mixture with further fat and optionally lecithin and liquefying.

The gas may be added before the mixture has been pressurised. In that case the gas is pressurised together with the mixture, for example it may be pressurised such that it dissolves in the mixture. Preferably the mixture is pressurised before gas is added.

Accordingly the process of making a fat based confectionery product comprising porous particles of the present invention may comprise the steps of:
  a) subjecting a mixture (for example an aqueous mixture) comprising sweetener, bulking agent and non-dairy protein to high pressure, for example 50 to 300 bar, for further example 100 to 200 bar;
  b) adding gas to the pressurised mixture;
  c) drying (for example spraying and drying) the mixture to form porous particles having an amorphous continuous phase;
  d) mixing the porous particles with fat and optionally ingredients selected from the group consisting of cocoa liquor, crystalline sugar, lecithin and combinations of these, for example at a temperature between 35 and 55° C. for 2 to 20 minutes;
  e) refining the resulting mixture to reduce the particle size of the porous particles; and
  f) mixing the refined mixture with further fat and optionally lecithin and liquefying.

The fat may for example be cocoa butter, cocoa butter equivalent or cocoa butter replacer. The fat may be cocoa butter. In an embodiment the liquefaction is carried out by conventional means well known to a person skilled in the art and refers to conching, a standard process in chocolate manufacture. In an embodiment, 15 to 30% of the total fat present after liquefying is used in step (f). The reduction of particle size may be such that the resulting porous particles have a D90 particle size distribution of between 30 and 60 microns, for example between 35 and 50 microns.

Roll refiners may be used to refine the mixture, for example a combination of 2-roll and 5-roll refiners may be used to refine the mixture. The larger the size of the porous particles compared to the minimum roller gap during refining, the more likely the particles are to be broken by the roll refining process. Agglomerated powders provide advantages as ingredients in terms of flowability and lower dustiness. The porous particles mixed with fat before refining may be in the form of an agglomerated powder. For example, the porous particles may be porous particles according to the invention agglomerated as part of a spray-drying process, for example an open top spray drier with secondary air recirculation to trigger particle agglomeration. The agglomerated particles may have a particle size distribution D90 of between 120 and 450 μm. The size of spray-dried particles before agglomeration or without agglomeration may be increased by increasing the aperture size of the spray-drying nozzle (assuming the spray-drier is of sufficient size to remove the moisture from the larger particles).

Advantageously, the harsh processing conditions of the chocolate making process such as refining does not destroy the porosity of the particles of the present invention, for example the particle size of agglomerated particles described above could be reduced by roller refining whilst still retaining much of their original closed porosity. For example, after refining the particles may retain at least 20%, 30%, 40% or 50% of their initial closed porosity, for further example the particles after refining may have a closed porosity between 20 and 60%. This was reflected in the food products such as the lighter coloration of for example chocolate products comprising the said particles of the present invention. Particles formed by spray drying are generally spherical in form. When formed into agglomerates, the agglomerated particles generally retain convex rounded surfaces composed of the surfaces of individual spherical particles. Refining spherical or agglomerated spherical particles causes fractures in the particles which leads to the formation of non-rounded surfaces. The refined particles according to the invention may have less than 70% of their surface being convex, for example less than 50%, for further example less than 25%.

After refining, less than 30% of the particles may be substantially spherical, for example less than 20% may be substantially spherical, for example less than 10% may be substantially spherical, for example less than 5% may be substantially spherical, for example essentially none of the particles may be substantially spherical. According to the present invention the term sphericity as used herein refers to in conventional terms a measure of how spherical (round) an object is. In the context of the present invention sphericity refer to the sphericity of the particles and is defined as Sphericity=$4\pi A/P^2$ wherein A is defined as the measured area covered by a particle projection and P is the measured perimeter of a particle projection.

For instance, an ideal sphere would have an expected the sphericity of 1. It is to be commonly understood however that a high degree of sphericity can still be achieved with values less than 1. For example a value between 0.6 and 1 (for example between 0.8 and 1) for an object or particle would be considered substantially spherical.

Imaging experiments show clearly that the particles of the present invention retain significant porosity after the chocolate preparation steps. Sensory evaluations performed showed good tasting qualities and light and creamy texture and mouthfeel indicative of particle porosity remaining intact within the product.

The amorphous continuous phase of the particles may comprise (for example consist on a dry basis of) sucrose, bulking agent and non-dairy protein, wherein the sucrose is present at a level of at least 30 wt. % and the ratio of sucrose to bulking agent is between 0.5 to 1 and 2.5 to 1 on a dry weight basis. The amorphous continuous phase of the porous particles may comprise (for example consist on a dry basis of) sucrose, soluble fibre and a plant protein selected from the group consisting of pea protein, wheat gluten, almond protein, coconut protein and soy protein (for example wheat gluten or almond protein), the sucrose being present at a level of at least 30 wt. %, the ratio of sucrose to soluble fibre being between 0.5 to 1 and 2.5 to 1 on a dry weight basis, for example between 0.6 to 1 and 1.7 to 1 on a dry weight basis. The amorphous continuous phase of the porous particles may comprise (for example consist on a dry basis of) sucrose, soluble fibre and a plant protein being wheat gluten or almond protein, the sucrose being present at a level of at least 30 wt. %, the ratio of sucrose to soluble fibre being between 0.5 to 1 and 2.5 to 1 on a dry weight basis, for example between 0.6 to 1 and 1.7 to 1 on a dry weight basis. The amorphous continuous phase of the porous particles may comprise (for example consist on a dry basis of) sucrose, soluble fibre and a plant protein selected from the group consisting of pea protein, almond protein, potato protein and coconut protein (for example pea protein or almond protein), the sucrose being present at a level of at least 30 wt. %, the ratio of sucrose to soluble fibre being between 0.5 to 1 and 2.5 to 1 on a dry weight basis, for example between 0.6 to 1 and 1.7 to 1 on a dry weight basis.

According to the present invention the porous particles in one embodiment are in the form of a powder. In an alternative embodiment, the said porous particles of the present invention may also be agglomerated by methods known in the art to obtain material with further improved handling properties such as flowability and lower dustiness.

In the following description reference is made to the use of the porous particles of the present invention as bulk sugar replacers in fat based confectionery products. The porous particles of the present invention may however also be used in a wide range of food products as aforementioned.

In the present invention the term bulk sugar replacer as used herein refers to a low or no calorie sugar substitute that can be substituted at a weight to weight and/or volume to volume basis for sugar. As aforementioned, the combination of the highly porous particles having an amorphous continuous phase provide a synergistic effect whereby a further bulking effect is achieved through aeration. In one aspect of the present invention this advantageously provides up to at least 70 volume % sugar reduction in a food product for example a fat based confectionery product. For example, at least 65 volume % of sugar may be reduced from a food product such as a fat based confectionery product.

For example, between 10 to 70 volume % of sugar may be reduced or removed from a food product such as a fat based confectionery product. For further example between 5 to 35 wt. % of sugar may be reduced or removed from a food product such as a fat based confectionery product.

The porous particles of the invention allow the sucrose content of a fat based confectionery material such as chocolate to be reduced without the need for ingredients that are unfamiliar to consumers. In an embodiment the invention provides a fat based confectionery material (for example chocolate) having the same sweetness as a control fat based confectionery material (for example chocolate), the control having a sucrose content between 20 and 45 wt. % (for example between 25 and 40 wt. %), but wherein the sucrose content (for example the sucrose content on a mass basis or the sucrose content on a volume basis) has been reduced by at least 20% (for example at least 30%) compared to the control, and wherein the fat based confectionery material contains no mono, di or tri-saccharides apart from sucrose or lactose and contains no sugar alcohols or high intensity sweeteners. For example, the fat based confectionery material may contain no saccharides apart from sucrose or lactose and no sugar alcohols or high intensity sweeteners. For example the control and the fat based confectionery material provided by the invention may consist of the same ingredients, merely in different proportions. For further example the crystalline sucrose content of the fat based confectionery material provided by the invention may be lower than that of the control. The fat based confectionery material provided by the invention may comprise porous particles comprising an amorphous continuous phase comprising sweetener, bulking agent and non-dairy protein.

In an embodiment of the invention where the porous particles are comprised within a fat based confectionery composition and the particles comprise an continuous phase comprising sucrose, bulking agent and non-dairy protein, increasing the proportion of bulking agent to sucrose reduces the amount of sucrose in the overall fat based confectionery composition. This can be advantageous, as many consumers would welcome a good tasting fat based confectionery with reduced sugar. Reducing the proportion of sucrose in the particles reduces their sweetness directly, but it also reduces the dissolution speed of the amorphous phase of the particles which further reduces sweetness impact in the mouth. However, the inventors have found that by increasing the porosity of the particles, in particular the closed porosity of the particles, they can increase the dissolution speed and so counteract that reduction of sweetness. Accordingly the invention may provide a fat based confectionery composition comprising
  a) cocoa powder or cocoa liquor or cocoa butter or cocoa butter equivalents or any combinations thereof and
  b) 5 to 60% (for example 20 to 55%) of porous particles according to the present invention.
wherein said porous particles have a moisture content of between 1% and 5% (for example between 2% and 3%), comprise an amorphous continuous phase comprising sucrose, bulking agent and non-dairy protein at a level of at least 95% of the particles on a dry basis (for example at least 98%), have a ratio of sucrose to bulking agent between 0.5:1 and 0.6:1 and have a closed porosity between 20% and 60%, for example between 25% and 50%, for further example between 25% and 40%. The porous particles may have a D90 particle size distribution of between 30 and 60 microns, for example between 35 and 50 microns. The inventors have investigated the impact on the stability of the porous particles of altering the ratio of sucrose to bulking agent.

In an embodiment of the present invention the porous particles of the present invention may be used as a bulk sugar replacer in a food product. The porous particles of the present invention may be used to reduce the sugar content of a food product. For example the porous particles may be used to reduce the sugar content (for example the sucrose content) of a fat-based confectionery product by between 10 and 70% on a volume basis, or to reduce the sugar content (for example the sucrose content) of a fat-based confectionery product by between 5 and 35% on a mass basis.

In another embodiment of the present invention the porous particles are preferably used in a food product such as a confectionery product, a culinary product, a dairy product, a nutritional formula, a breakfast cereal, pet food or an ice-cream.

In an embodiment of the present invention there is provided a sugar replacer composition consisting of porous particles comprising a continuous phase comprising a sweetener, a bulking agent and a non-dairy protein, wherein said porous particles have a closed porosity of between 10 and 80%.

Those skilled in the art will understand that they can freely combine all features of the present invention disclosed herein. In particular, features described for the composition of the present invention may be combined with the process of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

EXAMPLES

Spray-Drying

Porous powders having an amorphous continuous phase were obtained using NIRO SD6.3-N spray-dryer (GEA, Denmark) using a system of nitrogen injection which allows gassing between 0 and 5 NL/min. The gas is injected after the high pressure pump. The spraying pressure is maximum (120-130 bars) while injection pressure is around 10 bars above the spraying pressure. Typical flowrate is 10 L/h approximately, depending on the nozzle diameter (here 0.2 mm) and the solution composition.

SEM Images

Each powder was glued onto a metallic specimen stub equipped with a double-sided conductive tape. The stub was shaken to allow a good spreading of the powder. To see the inner structure of the powder, particles are cut with a razor blade on a part of the stub.

The samples were coated with a 10 nm gold layer using a Leica SCD500 sputter coater and subsequently imaged in a low vacuum mode at 10 kV using a Quanta F200 Scanning Electron Microscope or a Phenom Pro table-top Electron Microscope.

Visual Test to Assess Foamability Performance

A solution of 3% of protein was dissolved and then stirred for 30 s with a Polytron Mixer. Foamability of proteins was then visually assessed by taking pictures at t=0 min, t=4 min and t=45 min.

The matrix density was determined by DMA 4500 M (Anton Paar, Switzerland AG). The sample was introduced into a U-shaped borosilicate glass tube that is excited to vibrate at its characteristic frequency, which depends on the density of the sample. The accuracy of the instrument is 0.00005 g/cm$^3$ for density and 0.03° C. for temperature.

The apparent density of powders was measured by Accupyc 1330 Pycnometer (Micrometrics Instrument Corporation, US). The instrument determines density and volume by measuring the pressure change of helium in a calibrated volume with an accuracy to within 0.03% of reading plus 0.03% of nominal full-scale cell chamber volume.

Closed porosity is calculated from the matrix density and the apparent density, according to the following equation:

$$\text{Closed porosity} = 100 \cdot \left(1 - \frac{\rho_{apparent}}{\rho_{matrix}}\right)$$

Particle size distribution was measured by Camsizer XT (Retsch Technology GmbH, Germany). The technique of digital image analysis is based on the computer processing of a large number of sample's pictures taken at a frame rate of 277 images/seconds by two different cameras, simultaneously. Characteristic particle size $d_{10}$, $d_{50}$ and $d_{90}$ are calculated from normalized curves, corresponding to the particle size of 10%, 50% and 90% of the particles number respectively. The values reported in the study are $d_{90}$. The uncertainty is of 10 μm for the $d_{90}$ in the range of particle size of our powders.

Method of Dissolution Kinetics

The dissolution test was performed as follows. 30.0 g±0.1 g of water (milliQ grade) was placed in a 100 mL beaker (h=85 mm Ø=44 mm) with a magnetic stirrer (L=30 mm Ø=6 mm). The stirring rate was adjusted to 350 rpm and 1.000 g±0.002 g of powder was added in the solution. During the dissolution, the refractive index of the solution was registered each second until a plateau corresponding to complete dissolution was reached. Refractive index was measured using a FISO FTI-10 Fiber Optic Conditioner. These experiments were performed at room temperature (23-25° C.).

Wettability Measurement

The contact angle between the prepared thin film substrates and a drop of water was measured with a DSA (Drop Shape Analyzer, Krüss, Germany). A 14 mL water drop was generated and positioned on top of a powder bed or a thin film obtained by spin coating. The evolution of the droplet shape along time was recorded via a high-speed camera, and the contact angle between the drop and the layer was measured with the integrated software. Humidity of the surrounding air was not controlled during the experiments.

Chocolate Preparation

Model chocolates were prepared by pre-mixing crystalline sugar, skimmed milk, butter, lecithin vanilla and a part of cocoa butter (26% of the total amount). The pre-mix was refined by using the Refiner Exaakt (Haslas GmbH) with a refining gap of 30 μm and composed of 3 roll refiners. The remaining part of cocoa butter and porous powder was added after refining. The mixture was then tempered and moulded into tablets. All tablets contained the same weight of 26.5 g and were kept at ambient temperature during 3 h-4 h before de-moulding. The tablets were finally stored at cold temperature (4° C.).

Example 1

Preparation of the Amorphous Porous Particles with Non-Dairy Proteins

Three non-dairy proteins from different origins (vegetable, carbohydrate, grains) were tested as components of amorphous porous powders:
 Pea protein
 Potato protein
 Wheat gluten protein.

Foamability tests were performed in order to check if the proteins will allow the formation of small bubbles during spray-drying. Each protein was dissolved at 3% in water. Sodium caseinate was used as a reference.

Figure 1A:
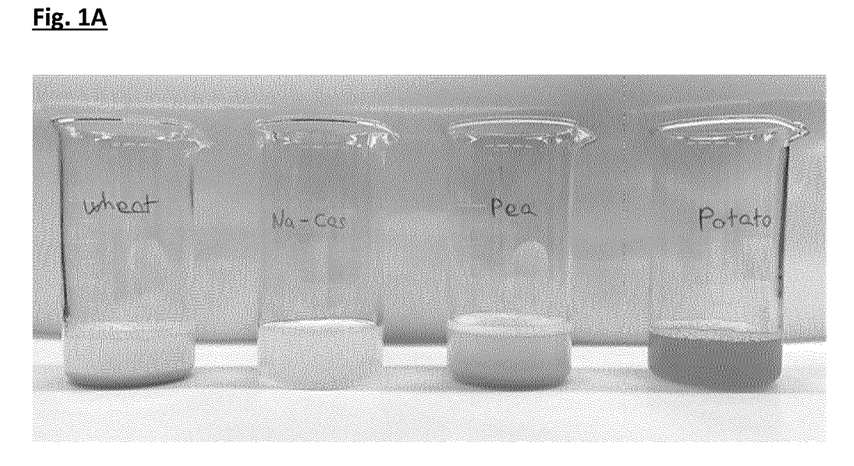
Figure 1B:
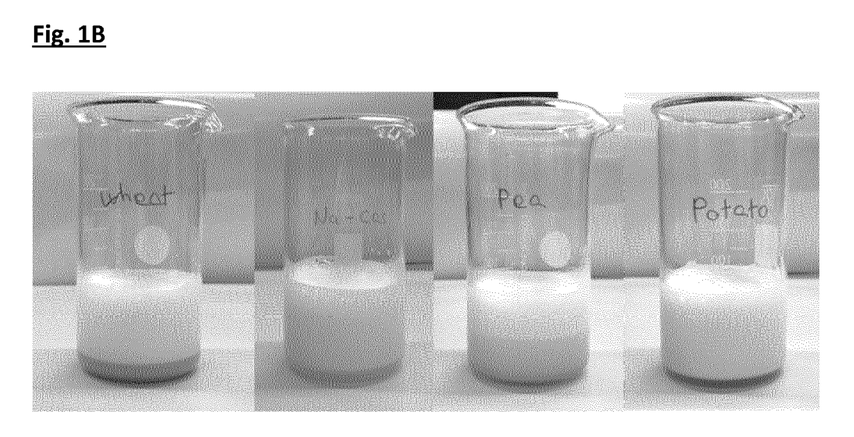
Figure 1C:
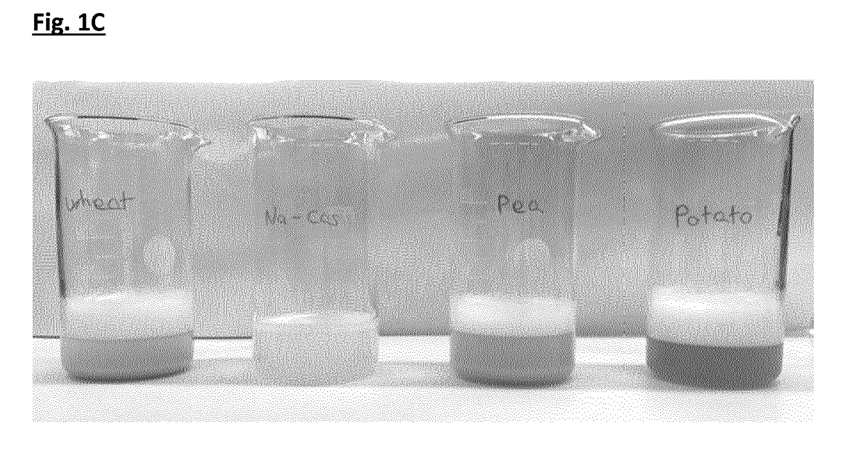

FIG. 1 shows the foams produced. After 30 seconds of mixing all proteins produced foams (FIG. 1B). After 45 min standing (FIG. 1C), all foams were still stable. Wheat gluten and potato proteins produced more stable foams than the reference with sodium caseinate (NaCas).

Wheat gluten protein, pea protein and potato protein were then used to prepare amorphous porous powders at a level of 3 wt. %. The other components were 60 wt. % sucrose and 37 wt. % Nutriose® (a plant-based fibre from Roquette). A further sample with pea protein was prepared where lactose was used as the bulking agent instead of Nutriose®. For comparison, a powder with 3 wt. % sodium caseinate, 60 wt. % sucrose and 37 wt. % Nutriose® was prepared. The components were dissolved in water at a total solids of 50% and spray dried with gas injection. All variants were successfully produced with a throughput of 10-12 L/h.

Physical and chemical characterization of the powders was performed. Results of moisture, glass transition and water activity are presented below.

|   |   | Moisture [%] | $T_g$ [° C.] | $a_w$ [—] |
|---|---|---|---|---|
| A | 60% Sucrose, 37% Nutriose ®, 3% NaCas | 2.50 | 48.8 | 0.162 |
| B | 60% Sucrose, 37% Nutrioe ®, 3% pea protein | 2.59 | 49.2 | 0.147 |
| C | 60% Sucrose, 37% lactose, 3% pea protein | 2.43 | 51.7 | 0.126 |
| D | 60% Sucrose, 37% Nutriose ®, 3% wheat gluten | 2.11 | 54.1 | 0.114 |
| E | 60% Sucrose, 37% Nutriose ®, 3% potato protein | 2.81 | 46.6 | 0.166 |

Results of particle properties are shown below.

Changing the surfactant (the protein) leads to changes in porosity. Pea protein, potato protein and wheat gluten protein provide high levels of closed porosity, although slightly lower than that obtained by sodium caseinate. The use the fibre Nutriose® seems to favour the formation of closed pores.

|   | Apparent density [g·cm$^{-3}$] | Tapped density [g·cm$^{-3}$] | Closed porosity [%] | $d_{90}$ [μm] |
|---|---|---|---|---|
| A | 0.624 | 0.276 | 60.8 | 70.2 |
| B | 0.804 | 0.392 | 49.5 | 60.0 |
| C | 0.893 | 0.472 | 43.9 | 55.8 |
| D | 0.749 | 0.258 | 53.3 | 58.1 |
| E | 0.772 | 0.273 | 51.0 | 87.2 |

Figure 2:
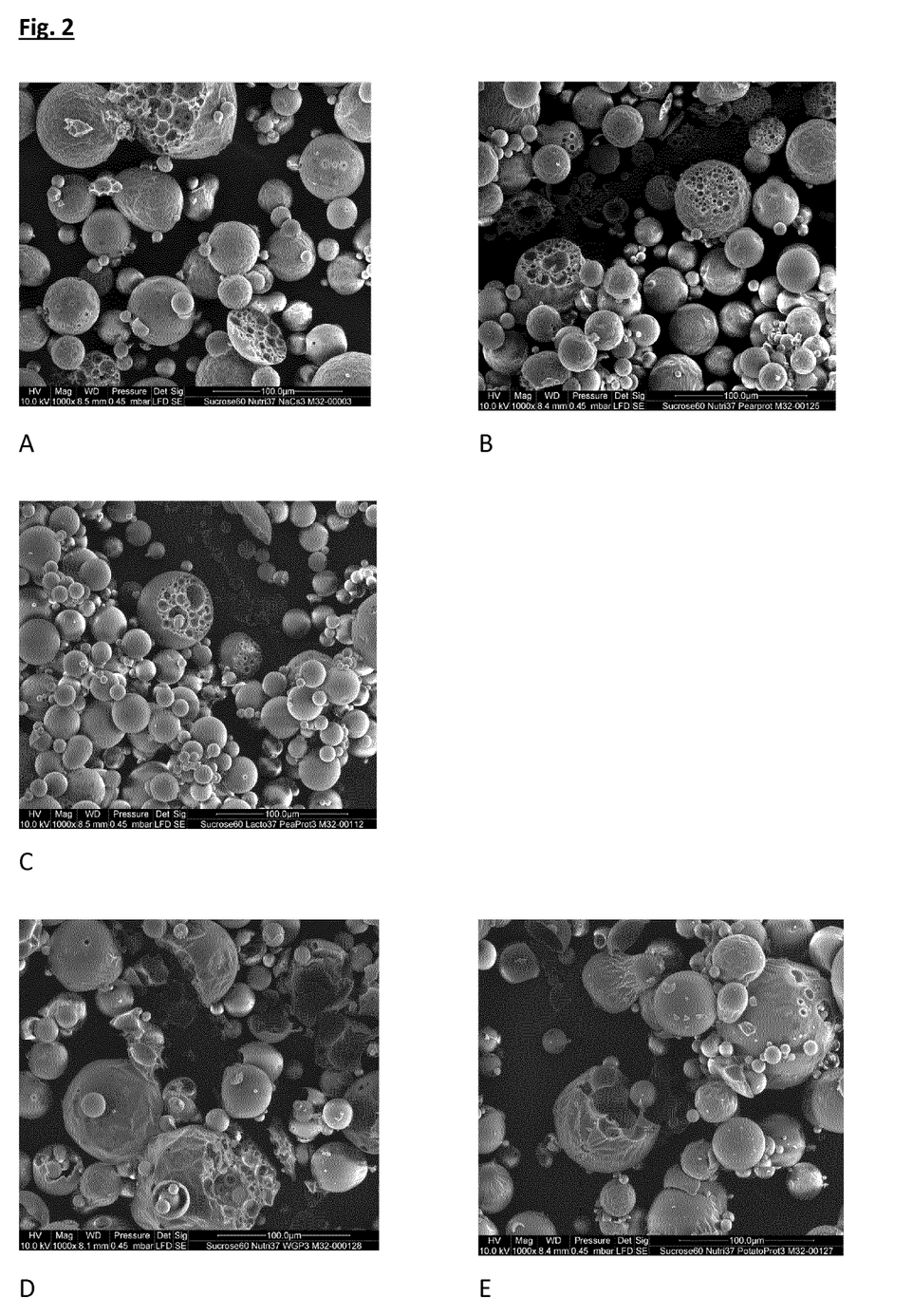
FIG. 2 shows scanning electron micrographs of porous amorphous powders. A: sucrose/Nutriose®/sodium caseinate, B: sucrose/Nutriose®/pea protein, C: sucrose/lactose/pea protein, D: sucrose/Nutriose®/wheat gluten, and E: sucrose/Nutriose®/potato protein.

The microstructure of the particles was investigated by SEM analysis (FIG. 2). Samples can be distinguished by two main subgroups. First, we observe that particles containing sodium caseinate and pea protein have a comparable structure. Particle size is between 5-70 microns. They are highly aerated, of which we observe mainly small bubbles or air channels of approximatively 5-10 microns. Open porosity, defined by the presence of aeration on the external surface of the particles, is only limited.

The other subgroup comprise particles containing wheat gluten protein and potato protein. Open porosity is slightly higher, due to thinner particle walls. Internal porosity show larger bubbles or air channels and is, comparatively, much more chaotic. The observed particle size is also larger, with particles up to 100 microns being observed.

Preliminary informal tasting of sample D (with wheat gluten) reported that it tasted sweeter than a dry mix of its components.

Example 2

Preparation of the Amorphous Porous Particles with Plant Milks

Plant milks were combined with maltodextrin (DE12-20) and sucrose so that, on a solids basis there was 5% plant milk, 35% maltodextrin and 60% sucrose. The mixtures were made up with water at a total solids level of 50% and spray dried with gas injection. All variants are successfully produced with a throughput of 10-12 L/h.

Physical and chemical characterization of the powders was performed. Results of moisture, glass transition and water activity are presented below.

|   |   | Moisture [%] | $T_g$ [° C.] | $a_w$ [—] |
|---|---|---|---|---|
| F | 60% Sucrose, 35% maltodextrin, 5% Spelt milk | 3.26 | 45.4 | 0.168 |
| G | 60% Sucrose, 35% maltodextrin, 5% Coconut milk | 3.03 | 47.3 | 0.166 |
| H | 60% Sucrose, 35% maltodextrin, 5% Oat milk | 3.45 | 42.1 | 0.194 |
| I | 60% Sucrose, 35% maltodextrin, 5% Almond milk | 3.22 | 45.6 | 0.177 |
| J | 60% Sucrose, 35% maltodextrin, 5% Rice milk | 3.40 | 43.2 | 0.187 |
| K | 60% Sucrose, 35% maltodextrin, 5% Soya milk | 3.68 | 42.0 | 0.203 |

Results of particle properties are shown below.

Changing the plant milk type leads to changes in porosity. All the variants were highly aerated and had a closed porosity greater than 35%.

|   |   | Apparent density [g · cm$^{-3}$] | Tapped density [g · cm$^{-3}$] | Porosity [%] | $d_{90}$ [μm] |
|---|---|---|---|---|---|
| F | 60% Sucrose, 35% maltodextrin, 5% Spelt milk | 0.866 | 0.407 | 45.20 | 89.6 |
| G | 60% Sucrose, 35% maltodextrin, 5% Coconut milk | 0.845 | 0.417 | 46.55 | 335.9 |
| H | 60% Sucrose, 35% maltodextrin, 5% Oat milk | 0.956 | 0.448 | 39.51 | 256.4 |
| I | 60% Sucrose, 35% maltodextrin, 5% Almond milk | 0.980 | 0.465 | 38.02 | 75.1 |
| J | 60% Sucrose, 35% maltodextrin, 5% Rice milk | 0.974 | 0.455 | 38.41 | 884.4 |
| K | 60% Sucrose, 35% maltodextrin, 5% Soya milk | 0.747 | 0.369 | 52.73 | 81.6 |

Figure 3:
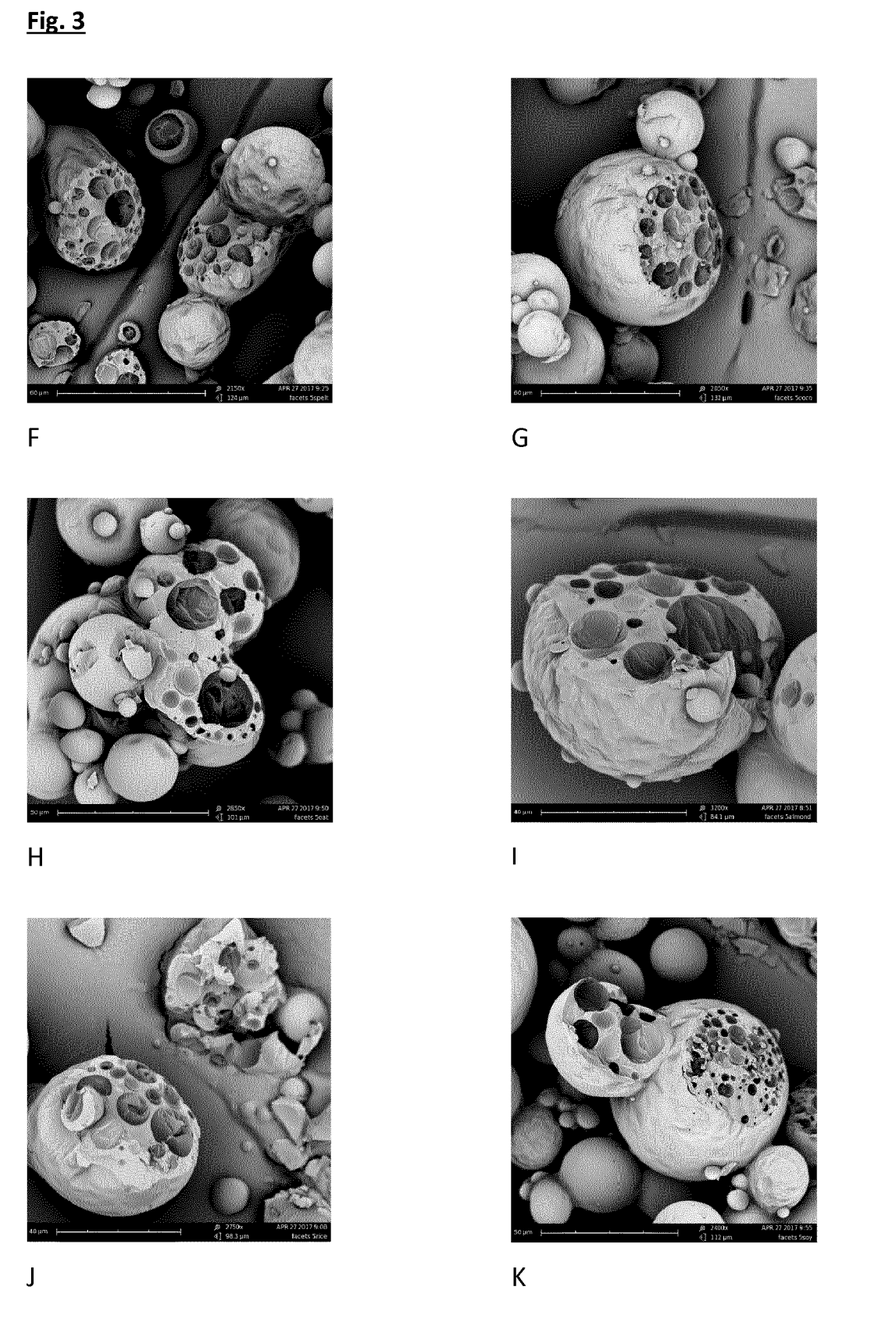
FIG. 3 shows scanning electron micrographs of porous amorphous powders with sucrose, maltodextrin, and F: spelt milk, G: coconut milk, H: oat milk, I: almond milk, J: rice milk and K: soya milk.

The microstructure of the particles was investigated by SEM analysis (FIG. 3). In terms of microstructure, they are all comparable. Particles size is in the order of magnitude of 70 microns, but their distribution is relatively poly-dispersed. Importantly, we observe that some powders are quite aggregated, which influences the $d_{90}$ laser scattering measurements. Aeration is observed with several air bubbles or channels per particle, with a size of around 10 microns. Only limited open porosity is observed.

Example 3

Kinetics of Dissolution

Figure 4:
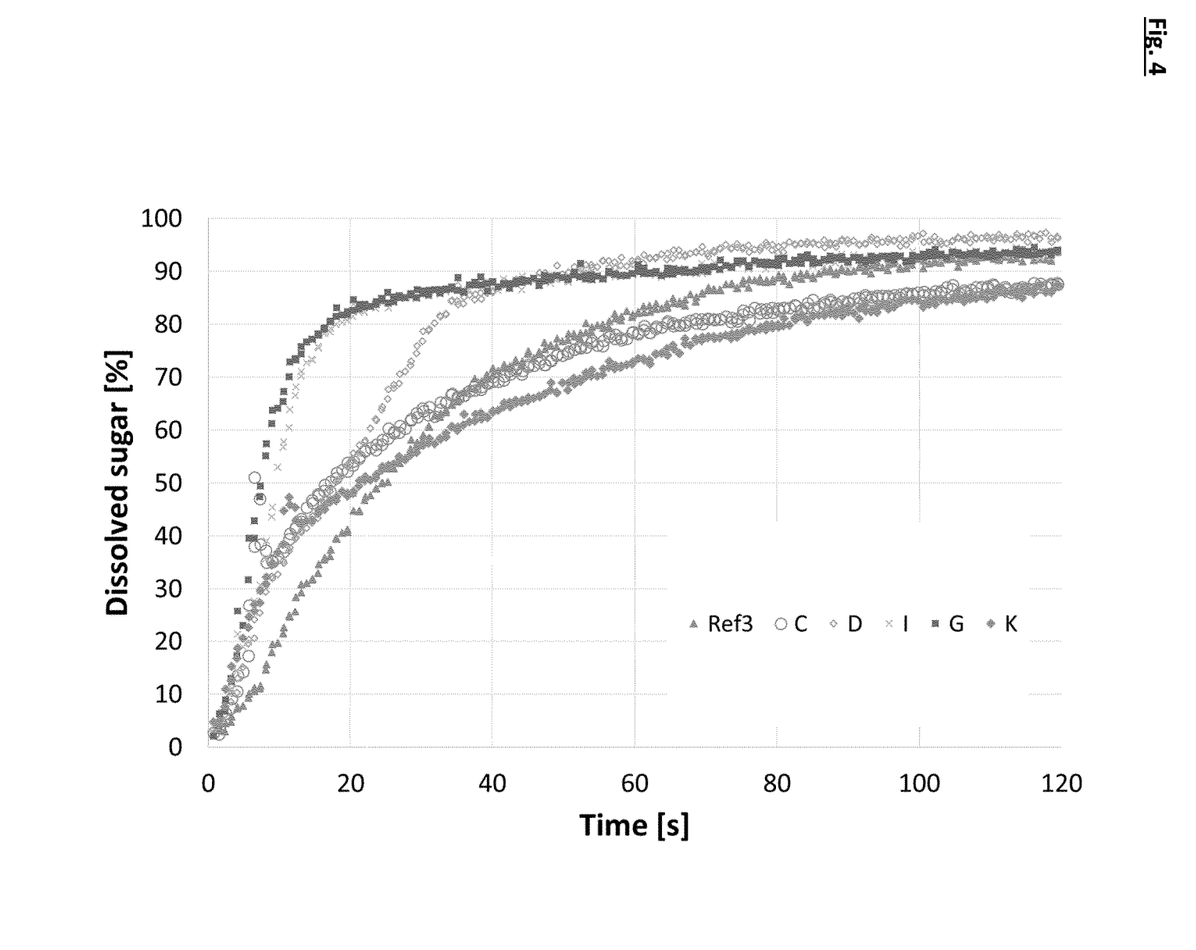
FIG. 4 shows the dissolution rates of porous amorphous powders. Sucrose and skimmed milk (Ref3), lactose and pea (C), Nutriose® and wheat gluten (D), maltodextrin and almond milk (I), maltodextrin and coconut milk (G) and maltodextrin and soya milk (K).

The kinetics of dissolution of five of the amorphous porous powders was measured and compared to that of a porous amorphous powder manufactured in the same manner, but with 60% sucrose and 40% skimmed milk (bovine) on a solids basis (Ref3). The samples assessed were lactose and pea (C), Nutriose® and wheat gluten (D), maltodextrin and almond milk (I), maltodextrin and coconut milk (G) and maltodextrin and soya milk (K). The results are plotted in FIG. 4. The powder with sucrose, almond milk and maltodextrin has a much faster dissolution that that of sucrose and skimmed milk. Both powders having a similar particle size. Faster dissolution of sweet tasting materials has been shown to correlate with increased sweetness perception.

Example 4

Wettability Measurements

Contact angle measurements are performed in order to assess the wetting properties of the porous amorphous powders prepared with sucrose, maltodextrin and plant milks (samples F, G, H, I, J, K) compared to a porous amorphous powder made from sucrose and skimmed milk (Ref3). All the plant milk samples were found to be completely wetting (0° contact angle), whereas the porous amorphous powder with skimmed milk powder (SMP) presents a good wetting but is not completely wetting, with contact angle of 10°. This provides an indication that the plant milk samples have better wetting properties than the SMP sample, but it should be noted that wettability on a powder bed is dependent on the particle size and the roughness of the powder. Also, the amount of proteins is not equal between the variants.

In order to eliminate the influence of particle shape and amount of proteins, contact angle measurements were performed on thin films layers of 20% protein solutions. The values in the table below are the averages of 4 experiments.

| Sodium caseinate | Pea protein | Potato protein | Wheat gluten protein |
|---|---|---|---|
| 68.1° ± 3.0° | 57.3° ± 1.6° | 37.7° ± 1.6° | 8.9° ± 1.8° |

It can be observed that pure dissolved pea, potato and wheat gluten proteins have better wetting than sodium caseinate. Improved wetting of a powder may lead to an improved mouthfeel when it is part of a foodstuff, especially when the powder is present at high levels.

Example 5

Chocolate

Different porous amorphous powders were successfully made into chocolates according to the recipes below.

|   | Porous powders used | | | | | |
|---|---|---|---|---|---|---|
|   | Ref3 | C | D | G | K | I |
| Butter | 9.82 | 9.82 | 9.82 | 9.82 | 9.82 | 9.82 |
| Skimmed milk powder | 1.82 | 1.82 | 1.82 | 1.82 | 1.82 | 1.82 |
| Cocoa butter | 29.14 | 29.14 | 29.14 | 29.14 | 29.14 | 29.14 |
| Sunflower lecithin | 0.57 | 0.57 | 0.57 | 0.57 | 0.57 | 0.57 |
| Vanilla | 0.09 | 0.09 | 0.09 | 0.09 | 0.09 | 0.09 |
| Porous powder | 58.57 | 58.57 | 58.57 | 58.57 | 58.57 | 58.57 |
| TOTAL weight | 100.00 | 100.00 | 100.00 | 100.00 | 100.00 | 100.00 |
| TOTAL volume | 158.57 | 146.02 | 166.04 | 151.94 | 166.04 | 135.90 |

The invention claimed is:

1. A process of making porous particles, the process comprising:
   subjecting a mixture comprising a sweetener, a bulking agent, almond milk, and 30-50 weight % water to a pressure in a range of 50-300 bar;
   adding gas to the mixture;
   drying the mixture to form the porous particles comprising an amorphous continuous phase and having a moisture content of 0.5-6%; and
   reducing the particle size of the porous particles,
   the amorphous continuous phase of the porous particles comprises sucrose, soluble fiber, and the almond milk, wherein the porous particles have a closed porosity of between 20% and 80%.

2. The process according to claim 1, wherein the gas is selected from the group consisting of nitrogen, air, carbon dioxide, argon, nitrous oxide, and mixtures thereof.

3. The process according to claim 1, wherein the drying comprises spray-drying.

4. The process according to claim 3, wherein the porous particles are agglomerated during or after the spray-drying.

5. The process according to claim 1, wherein the amorphous continuous phase of the porous particles has a glass transition temperature of 40° C. or higher.

* * * * *